(12) United States Patent
Kim et al.

(10) Patent No.: US 9,346,046 B2
(45) Date of Patent: May 24, 2016

(54) SINTERED POROUS PLASTIC PLUG FOR SEROLOGICAL PIPETTE

(71) Applicant: Porex Corporation, Fairburn, GA (US)

(72) Inventors: Edward Jino Kim, Riverdale, GA (US); Christopher Lynch, Atlanta, GA (US); Shivananada Patrick, Newnan, GA (US); Guoqiang Mao, Peachtree City, GA (US)

(73) Assignee: Porex Corporation, Fairburn, GA (US)

( * ) Notice: Subject to any disclaimer, the term of this patent is extended or adjusted under 35 U.S.C. 154(b) by 0 days.

(21) Appl. No.: 14/379,132

(22) PCT Filed: Mar. 5, 2013

(86) PCT No.: PCT/US2013/029134
§ 371 (c)(1),
(2) Date: Aug. 15, 2014

(87) PCT Pub. No.: WO2013/134271
PCT Pub. Date: Sep. 12, 2013

(65) Prior Publication Data
US 2015/0030512 A1    Jan. 29, 2015

Related U.S. Application Data

(60) Provisional application No. 61/607,100, filed on Mar. 6, 2012.

(51) Int. Cl.
*B01L 3/02* (2006.01)
*B23P 19/04* (2006.01)

(52) U.S. Cl.
CPC ............... *B01L 3/0275* (2013.01); *B23P 19/04* (2013.01); *B01L 2200/025* (2013.01);
(Continued)

(58) Field of Classification Search
CPC .............................. B01L 3/0275; B23P 19/04
USPC .................................................. 422/405, 535
See application file for complete search history.

(56) References Cited

U.S. PATENT DOCUMENTS 3,141,321 A    7/1964  Rinaldi
4,402,959 A    9/1983  Dybas et al.
(Continued)

FOREIGN PATENT DOCUMENTS

EP    2198804    6/2010
WO    9831465    7/1998
(Continued)

OTHER PUBLICATIONS

"ISO 5636-5 Paper and Board—Determination of Air Permeance and Air Resistance (medium range)—Part 5: Gurley method", International Standard ISO/IEC, 13818-1:2000 (E), Geneva, vol. SIO 5636, Part 5 (whole document), Jun. 1, 2003, 13 pages.
(Continued)

*Primary Examiner* — Jill Warden
*Assistant Examiner* — Jacqueline Brazin
(74) *Attorney, Agent, or Firm* — Kilpatrick Townsend & Stockton LLP

(57) ABSTRACT

The present invention provides sintered porous plastic plugs for use in filtered serological pipettes which facilitate manufacture or assembly of the filtered serological pipettes. In one embodiment, a sintered porous plastic plug of the present invention comprises plastic and a cylindrical body, a first end and a second end, the first end having a cross-sectional area less than the cross-sectional area of the cylindrical body, and the second end having a cross-sectional area less than the cross-sectional area of the cylindrical body.

20 Claims, 8 Drawing Sheets

(52) U.S. Cl.
CPC . *B01L 2200/0684* (2013.01); *B01L 2200/0689* (2013.01); *B01L 2200/141* (2013.01); *B01L 2300/069* (2013.01); *B01L 2300/0681* (2013.01); *B01L 2300/0832* (2013.01); *B01L 2400/0672* (2013.01); *Y10T 29/49945* (2015.01)

(56) References Cited

U.S. PATENT DOCUMENTS

| | | | |
|---|---|---|---|
| 4,430,381 | A | 2/1984 | Harvey et al. |
| 4,533,435 | A | 8/1985 | Intili |
| 4,625,026 | A | 11/1986 | Kim |
| 4,736,467 | A | 4/1988 | Schwarze et al. |
| 4,855,139 | A | 8/1989 | Srinivasan |
| 5,069,907 | A | 12/1991 | Mixon et al. |
| 5,091,102 | A | 2/1992 | Sheridan |
| 5,156,811 | A * | 10/1992 | White ............ B01D 39/16 210/416.1 |
| 5,563,356 | A * | 10/1996 | Mussi et al. ............ 73/864.14 |
| 5,639,464 | A | 6/1997 | Terry et al. |
| 5,853,883 | A | 12/1998 | Nohr et al. |
| 5,854,147 | A | 12/1998 | Nohr et al. |
| 5,894,042 | A | 4/1999 | Ferralli |
| 5,919,554 | A | 7/1999 | Watterson, III et al. |
| 6,551,608 | B2 | 4/2003 | Yao |
| 2002/0134175 | A1 * | 9/2002 | Mehra et al. ............ 73/863.85 |
| 2003/0099576 | A1 | 5/2003 | Li et al. |
| 2003/0173284 | A1 * | 9/2003 | Baker ............ 210/321.6 |
| 2008/0199363 | A1 * | 8/2008 | Mao ............ B01J 20/26 422/400 |
| 2011/0259443 | A1 * | 10/2011 | Preschutti et al. ............ 137/343 |

FOREIGN PATENT DOCUMENTS

| | | |
|---|---|---|
| WO | 0188185 | 11/2001 |
| WO | 2008021539 | 2/2008 |
| WO | 2008/100500 A2 | 8/2008 |
| WO | 2013134271 | 9/2013 |

OTHER PUBLICATIONS

International Application No. PCT/US2013/029134, International Search Report and Written Opinion mailed Jun. 26, 2013.
Office Action, Chinese Patent Application No. 201380012387.6, mailed May 28, 2015.
International Preliminary Report on Patentability, PCT Patent Application No. PCT/US2013/029134, mailed Sep. 18, 2014.
Office Action, European Patent Application No. 13710251.3, mailed Oct. 23, 2015.

* cited by examiner

SINTERED POROUS PLASTIC PLUG FOR SEROLOGICAL PIPETTE

This application is a U.S. national phase patent application under 35 U.S.C. 371 of International Patent Application No. PCT/US2013/029134, filed Mar. 5, 2013, which claims the benefit of priority to U.S. Provisional application Ser. No. 61/607,100 filed Mar. 6, 2012, each of which is incorporated herein by reference in its entirety.

PRIOR RELATED APPLICATIONS

This application claims the benefit of priority to U.S. Provisional application Ser. No. 61/607,100 filed Mar. 6,2012, which is incorporated herein by reference in its entirety.

FIELD OF THE INVENTION

The present invention relates to sintered porous plastic plugs for venting and filtering in pipettes, particularly serological pipettes. The sintered porous plastic plugs are efficiently inserted into the pipettes and are self-aligning upon insertion.

BACKGROUND OF THE INVENTION

Pipettes, including serological pipettes, are widely used in laboratory to transfer liquid samples. To prevent contamination of suction devices by over pipetting and aerosol contamination, cotton plugs were widely used in serological devices. Cotton plugs are cheap and easy to assemble into the serological pipette. However, cotton plugs do not provide a good aerosol barrier or prevent over pipetting with potential contamination of the pipetting device. Other porous media such as fabric based self-sealing media have been described in the literature (US 2003/0099576). Frusto-conical sintered porous self-sealing plugs have been used as filters in frusto-conical plastic pipette tips (U.S. Pat. No. 5,156,811). However, there have been no commercial products for cylindrical serological pipettes that employ sintered porous plastic plugs. One obstacle preventing use of sintered porous plastic as a serological pipette filter plug is that fast speed insertion methods require perfect alignment of the filter plug and the serological pipette. The assembly of the filter plug into the serological pipette is generally accomplished using high speed automated equipment. If the filter plug and the serological pipette are not properly aligned during assembly, the serological pipette and filter plug can be torn or bent leading to problems in downstream processing, fragmentation of the plug, and potential failure of the device. Current cylindrically shaped pipette filter plugs with sharp edges do not meet high speed insertion requirements because slight misalignment causes shut down of high speed machine assembly machines. What is needed is a plug design that permits rigid sintered porous plastic plugs to be self-centering and self-guiding during the high speed insertion process to improve production efficiency.

SUMMARY

In view of the foregoing disadvantages, the present invention, in one aspect, provides sintered porous plastic filter plugs for use in serological pipettes which can facilitate manufacture or assembly of the serological pipettes containing the filter plugs. In some embodiments, sintered porous plastic plugs of the present invention can correct for misalignments between the plug and a serological pipette during assembly of the plug into the serological pipette, thereby reducing the potential for serological pipette and plug tearing and/or bending. Preventing plug and serological pipette degradation and maintaining alignment during the assembly processes results in the efficient production of filtered serological pipettes with favorable performance characteristics, and reduces manufacturing inefficiencies resulting from quality control issues associated with defective filtered serological pipettes. One embodiment of this invention is design of a sintered porous plastic plug that is self-centering and self-guiding into the opening of serological pipette to reduce misalignment and machine down time. Self-centering means that the filter plug, when inserted into the opening of a device, such as a serological pipette, may not be perfectly aligned with the opening of the device, however by their design the plugs can self-align with the opening of the device, such as a serological pipette and insert properly into the lumen of the device. Another embodiment of this invention provides good self-sealing and aerosol barrier properties of sintered porous plastic filter plugs to prevent accidental over pipetting of liquids and aerosols passing through the filter plug in the serological pipette. This feature decreases the possibility of contamination of the pipetting device and possibly the operator of the pipetting device with infectious agents, such as bacteria or viruses in the liquid sample, to be transferred with the pipetting device.

In some embodiments, the sintered porous plastic filter plugs have a body which is cylindrical, and a first end and a second end. In some embodiments, the first end is tapered or chamfered relative to the cylindrical body. In some embodiments, both the first end and the second end are tapered or chamfered relative to the cylindrical body. The terms tapered and chamfered are used interchangeably herein. The tapered structure of one or both ends of the sintered porous plastic filter plugs permits their easy insertion and use in a variety of pipettes and pipette tips. The cylindrical body of the sintered porous plastic filter plug provides the benefit of a tight seal between the filter and inner wall of the pipette housing. This is especially true for a serological pipette. The sintered porous plastic filter plugs described herein may be used in numerous devices which require insertion of a porous filter into a pipette housing containing an opening and benefit from the self-centering and self-aligning of the plug relative to the opening and lumen in the pipette housing. This is particularly important for devices with a long body and narrow opening, such as a volumetric pipette, serological pipette or a robotic pipette. The body and/or the end of the sintered porous plastic filter plugs may be engaged by a transfer device for insertion into the lumen of a pipette.

In one embodiment, the first end has a cross-sectional area or diameter less than the cross-sectional area or diameter of the cylindrical body. In another embodiment, the second end has a cross-sectional area or diameter less than the cross-sectional area or diameter of the cylindrical body. In yet another embodiment, both the first end and the second end have cross-sectional areas or diameters less than the cross-sectional area or diameter of the cylindrical body.

In some embodiments, the first end or the second end is tapered relative to the cross-sectional area of the cylindrical body. In some embodiments, both the first end and the second end of the sintered porous plastic plug are tapered. In other embodiments, the first end or the second end of the sintered porous plastic plugs is recessed from the perimeter of the body. Moreover, in some embodiments, both the first end and the second end are recessed from the perimeter of the body.

In some embodiments, only the first end or the second end of the sintered porous plastic filter plug has a cross-sectional area less than the cross-sectional area of the body of the sintered porous plastic filter plug.

The first end and/or the second end of the sintered porous plastic filter plug may have any shape, including but not limited to circular or polygonal.

The first end or the second end of the sintered porous plastic filter plug, according to some embodiments of the present invention, can correct misalignment between the sintered porous plastic plug and a serological pipette during insertion of the sintered porous plastic filter plug into the serological pipette. In the event the sintered porous plastic filter plug and serological pipette are misaligned prior to assembly or engagement, the smaller cross-sectional area of the first or second end of the sintered porous plastic filter plug can still fit within the opening of the serological pipette. Once in the opening of the sintered porous plastic plug holder, the first or second end of the sintered porous plastic filter plug aligns the body of the sintered porous plastic plug with the serological pipette as the sintered porous plastic plug is inserted into the serological pipette, thereby correcting misalignment between the sintered porous plastic plug and serological pipette. The first or second end of a sintered porous plastic filter plug of the present invention aligns the body of the sintered porous plastic plug with the central lumen of the serological pipette, whether the sintered porous plastic plug is pushed into the serological pipette or whether the serological pipette is pushed over the sintered porous plastic plug.

As discussed herein, correcting misalignment between the sintered porous plastic plug and serological pipette reduces or precludes sintered porous plastic plug and serological pipette tearing or bending during assembly of the sintered porous plastic plug into the serological pipette. A sintered porous plastic plug wherein the ends of the sintered porous plastic plug have the same or substantially the same cross-sectional area as the body of the sintered porous plastic filter plug cannot correct for misalignment between the sintered porous plastic plug and the serological pipette and, as a result, requires accurate alignment with the serological pipette in order to avoid tearing or bending.

In some embodiments, misalignment between a sintered porous plastic filter plug and a serological pipette results from slight misalignment of a serological pipette the insertion device containing a sintered porous plastic filter plug.

In another aspect, the present invention provides methods of making a filtered serological pipette. In one embodiment, a method of making a filtered serological pipette comprises providing a sintered porous plastic filter plug comprising a porous body, a first end and a second end, the first end having a cross-sectional area less than the cross-sectional area of the body, and the second end having a cross-sectional area less than the cross-sectional area of the body, and at least partially disposing the sintered porous plastic filter plug in the serological pipette.

These and other embodiments are presented in further detail in the detailed description which follows.

DETAILED DESCRIPTION

Figure 1:
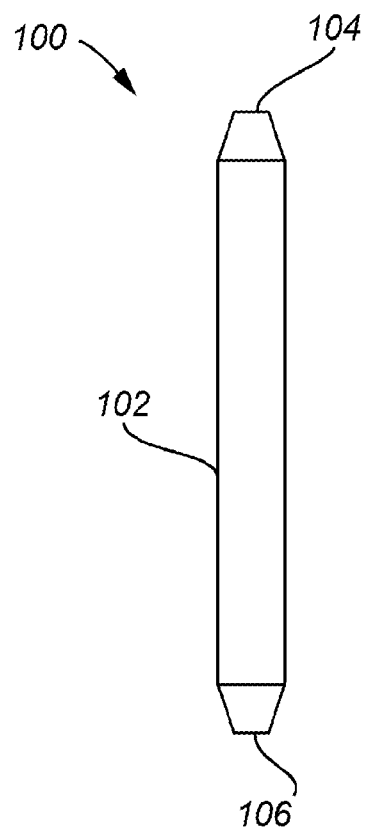
FIG. 1 is a perspective view of a sintered porous plastic filter plug according to one embodiment of the present invention.

The present invention provides sintered porous plastic filter plugs for use in serological pipettes which can facilitate manufacture or assembly of the serological pipettes containing the sintered porous plastic filter plugs. In some embodiments, sintered porous plastic filter plugs of the present invention can correct for misalignments between the sintered porous plastic filter plug and serological pipette reducing the potential for sintered porous plastic filter plug and serological pipette tearing, bending and/or crushing during the assembly of a filtered serological pipette. The terms sintered porous plastic filter plugs and sintered porous plastic plugs are used interchangeably herein.

Preventing sintered porous plastic filter plug degradation and maintaining sintered porous plastic filter plug alignment during the assembly process results in the production of filtered serological pipettes with favorable performance characteristics and reduces manufacturing inefficiencies resulting from quality control issues associated with defective serological pipettes. Preventing sintered porous plastic plug degradation and maintaining sintered porous plastic plug alignment during assembly processes, in some embodiments, for example, can increase or maintain manufacturing line speeds as the jamming of assembly equipment caused by misaligned sintered porous plastic plugs or serological pipettes is reduced or eliminated. Moreover, in some embodiments, preventing sintered porous plastic plug degradation reduces the frequency and the degree to which assembly machinery must be cleaned due to dust accumulation resulting from pieces of sintered porous plastic plugs sheared during the assembly process.

The present invention also provides methods of making filtered serological pipettes.

Sintered Porous Plastic Plugs for Use in Serological Pipettes

In one embodiment a sintered porous plastic plug of the present invention comprises a cylindrical porous body, a first end and a second end, the first end having a cross-sectional area less than the cross-sectional area of the body, and the second end having a cross-sectional area less than the cross-sectional area of the body. In some embodiments, the first end or the second end is tapered. In some embodiments, both the first end and the second end of the sintered porous plastic plug are tapered. In other embodiments, the first end or the second end of the sintered porous plastic plug is recessed from the perimeter of the body. Moreover, in some embodiments, both the first end and the second end are recessed from the perimeter of the body.

In some embodiments, only the first end or the second end of the sintered porous plastic plug has a cross-sectional area less than the cross-sectional area of the cylindrical body of the sintered porous plastic plug.

A sintered porous plastic plug, according to some embodiments of the present invention, has any desired shape. In some embodiments, a sintered porous plastic plug has a cylindrical shape. In some embodiments, a sintered porous plastic plug has a cylindrical shape with length to diameter ratio greater than 1, or greater than 2, or greater than 3, or greater than 4, or greater than 5.

Sintered porous plastic plugs may be made in different diameters and lengths, depending on the chosen serological pipette. In some embodiments, plugs may have a length of up to 2 mm, 3 mm, 4 mm, 5 mm, 6 mm, 7 mm, 10 mm, or 15 mm or more. It is to be understood that the plugs may also have any length between these recited lengths.

In different embodiments, sintered porous plastic plugs may have a water intrusion pressure of greater than 0.05 bar, 0.1 bar, 0.2 bar, 0.3 bar, 0.4 bar, 0.5 bar, 0.6 bar, 0.7 bar, 0.8 bar or 1 bar.

Figure 4:
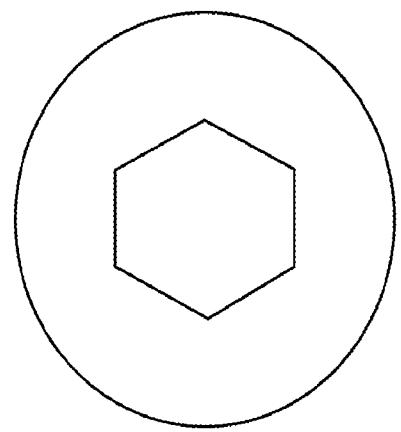
FIG. 4 is an end on view of different shapes of the first end/and/or the second end of the sintered porous plastic filter plug. A circular, triangular and a hexagonal end shape are shown.
Figure 4:
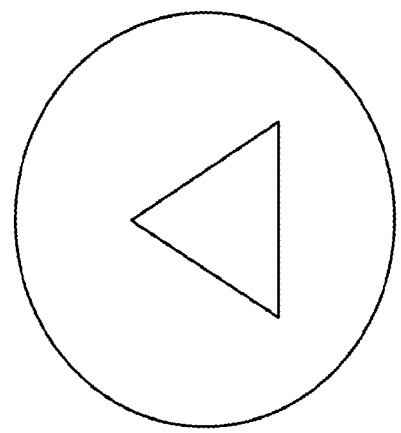
Figure 4:
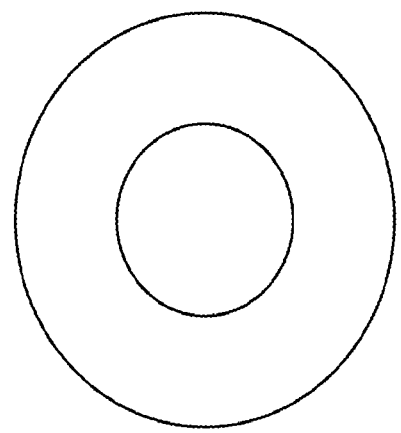

In some embodiments, the first end or the second end or both the first end and the second end of the sintered porous plastic plug has a polygonal shape, a curved shape, a spherical shape, or any shape that is less than the cross sectional area of the body of the sintered porous plastic plug (FIG. 4).

It is to be understood that the first end and the second end may have the same or different shapes.

FIG. 1 illustrates a perspective view of a sintered porous plastic plug according to one embodiment of the present invention. In this embodiment, the first end and the second end are chamfered. As illustrated in FIG. 1, the sintered porous plastic plug (100) comprises a cylindrical body (102), a first end (104) and a second end (106). The first end (104) and the second end (106) of the sintered porous plastic plug (100) are tapered or chamfered, each having a cross-sectional area less than the cross-sectional area of the body (102).

Figure 2:
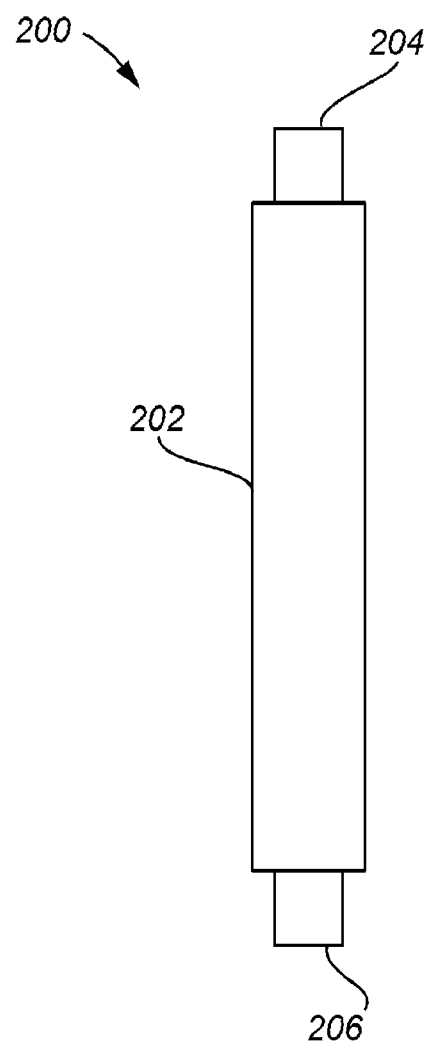
FIG. 2 is a perspective view of a sintered porous plastic filter plug according to one embodiment of the present invention.

FIG. 2 illustrates a perspective view of a sintered porous plastic plug according to another embodiment of the present invention. The sintered porous plastic plug (200) illustrated in FIG. 2 comprises a cylindrical body (202), a first end (204) and a second end (206). The first end (204) and the second end (206) each have a cross-sectional area less than the cross-sectional area of the body (202). In contrast to being tapered, the first end (204) and the second end (206) are recessed from the perimeter of the body (202) of the sintered porous plastic plug (200).

Figure 3:
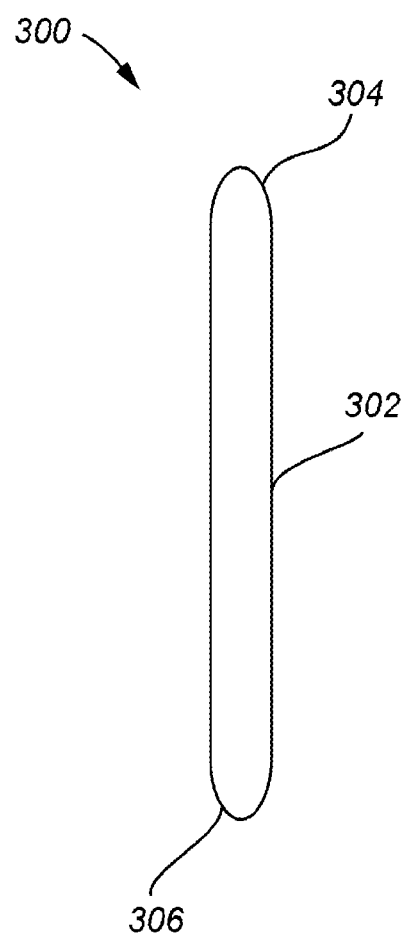
FIG. 3 is a perspective view of a sintered porous plastic filter plug according to one embodiment of the present invention.

FIG. 3 illustrates a perspective view of a sintered porous plastic plug according to another embodiment of the present invention. The sintered porous plastic plug (300) illustrated in FIG. 3 comprises a cylindrical body (302), a first end (304) and a second end (306). The first end (304) and the second end (306) are curved and each has a cross-sectional area less than the cross-sectional area of the body (302).

Figure 8:
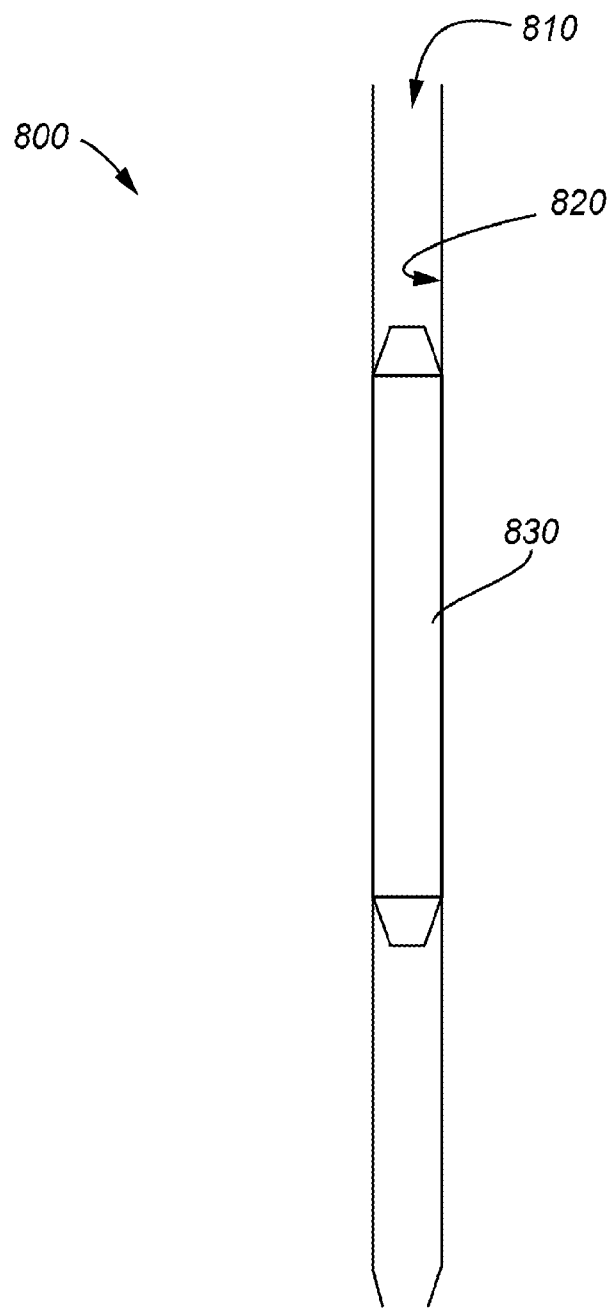
FIG. 8 is a perspective view of a sintered porous plastic filter plug shown within a serological pipette.

FIG. 8 illustrates a cross sectional view of a cylindrical serological pipette (800) with a central lumen (810) and inner walls (820). The sintered porous plastic plug with a cylindrical body and tapered ends shown in FIG. 1 (830) is located within the lumen (810) and frictionally fit to the inner walls (820) of the serological pipette (800).

In some embodiments, the cross-sectional area of the first end and the cross-sectional area of the second end of a sintered porous plastic plug is less than the cross-sectional area of the body of the plug by any desired amount. Factors governing the cross-sectional areas of the first and second ends of the sintered porous plastic plug include tolerances imposed by the serological pipette during the assembly of a filtered serological pipette.

In one embodiment, the cross-sectional area or diameter of the first end is less than the cross-sectional area or diameter of the body of the plug and the cross-sectional area or diameter of the second end of a sintered porous plastic plug is the same as the cross-sectional area or diameter of the body of the plug.

In some embodiments, the first end and/or the second end of the sintered porous plastic plug has a cross-sectional area of at least 5% less than the cross-sectional area of the body of the sintered porous plastic plug. In some embodiments, the first end and/or the second end of the sintered porous plastic plug has a cross-sectional area of at least 10% less than the cross-sectional area of the body of the sintered porous plastic plug. In other embodiments, the first end and/or the second end of the sintered porous plastic plug has a cross-sectional area of at least 20% less than the cross-sectional area of the body of the sintered porous plastic plug. In another embodiment, the first end and/or the second end of the sintered porous plastic plug has a cross-sectional area of at least 30% less than the cross-sectional area of the body of the sintered porous plastic plug. In a further embodiment, the first end and/or the second end of the sintered porous plastic plug has a cross-sectional area of at least 50% less than the cross-sectional area of the body of the sintered porous plastic plug.

In some embodiments, the first end and the second end of the sintered porous plastic plug have the same or substantially the same cross-sectional area. In some embodiments wherein the first and second ends of the sintered porous plastic plug have the same cross-sectional area, orientation of the sintered porous plastic plug prior to assembly in a sintered porous plastic plug holding device and/or a serological pipette is not required. In other embodiments, the first end and the second end of the sintered porous plastic plug have different cross-sectional areas.

The first or second end of a sintered porous plastic plug of the present invention can assist in self-aligning the body of the sintered porous plastic plug and the lumen of the serological pipette when the sintered porous plastic plug is pushed into the serological pipette or when the serological pipette is pushed over the sintered porous plastic plug.

In some embodiments, a sintered porous plastic plug of the present invention has an average pore size ranging from about 1 µm to about 500 µm. In another embodiment, a sintered porous plastic plug of the present invention has an average pore size ranging from about 5 µm to about 200 µm, or from about 10 µm to about 100 µm, or from about 10 µm to about 200 µm, or from about 10 µm to about 150 µm, or from about 10 µm to about 50 µm, or from about 10 µm to about 30 µm. In some embodiments, a sintered porous plastic plug has an average pore size ranging from about 30 µm to about 120 µm or from about 15 µm to about 50 µm. In a further embodiment, a sintered porous plastic plug has an average pore size less than about 1 µm or greater than about 500 µm.

In some embodiments, a sintered porous plastic plug of the present invention has a porosity ranging from about 10 percent to about 90 percent. In another embodiment, a sintered porous plastic plug of the present invention has a porosity ranging from about 20 percent to about 80 percent. In another embodiment, a sintered porous plastic plug of the present invention has a porosity ranging from about 30 percent to about 60 percent. In some embodiments, a sintered porous plastic plug has a porosity ranging from about 40 percent to about 50 percent. In a further embodiment, a sintered porous plastic plug has a porosity less than about 10 percent or greater than about 90 percent. In a further embodiment, a sintered porous plastic plug has a porosity greater than about 20 percent.

In some embodiments, the air flow of the plug is less than 500 seconds, less than 400 seconds, less than 300 seconds, less than 200 seconds or less than 100 seconds for passing 300 cc of air through the part based on the ISO/DIS 5636-5 testing method.

In some embodiments, sintered polymeric materials of the present invention comprise one or a plurality of plastics. Plastics, as used herein, include flexible plastics and rigid plastics. Flexible plastics, in some embodiments, comprise polymers possessing moduli ranging from about 15,000 N/cm$^2$ to about 350,000 N/cm$^2$ and/or tensile strengths ranging from about 1500 N/cm$^2$ to about 7000 N/cm$^2$. Rigid plastics, according to some embodiments, comprise polymers possessing moduli ranging from about 70,000 N/cm$^2$ to about 350,000 N/cm$^2$ and have tensile strengths ranging from about 3000 N/cm$^2$ to about 8500 N/cm$^2$.

Plastics suitable for use in sintered polymeric filter plugs of the present invention, in some embodiments, comprise polyolefins, polyamides, polyesters, rigid polyurethanes, polyacrylonitriles, polycarbonates, polyvinylchloride, polymethylmethacrylate, polyvinylidene fluoride, polyethersulfones, polystyrenes, polyether imides, polyetheretherketones, polysulfones, and combinations and copolymers thereof. In some embodiments, a polyolefin comprises polyethylene, polypropylene, and/or combinations and copolymers thereof. In some embodiments plastics suitable for use in sintered polymeric filter plugs of the present invention comprise polyethylene, polypropylene, and combinations and copolymers thereof.

Polyethylene, in one embodiment, comprises high density polyethylene (HDPE). High density polyethylene, as used herein, refers to polyethylene having a density ranging from about 0.92 g/cm$^3$ to about 0.97 g/cm$^3$. In some embodiments, high density polyethylene has a degree of crystallinity (% from density) ranging from about 50 to about 90. In another embodiment, polyethylene comprises ultrahigh molecular weight polyethylene (UHMWPE). Ultrahigh molecular weight polyethylene, as used herein, refers to polyethylene having a molecular weight greater than 1,000,000. In another embodiment, polyethylene comprises low density weight polyethylene (LDPE). In another embodiment, polyethylene comprises linear low density weight polyethylene (LLDPE). Combinations of more than one polyethylene (such as HDPE, UHMWPE, LDPE and LLDPE) may be employed.

In some embodiments a sintered porous plastic plug of the present invention is a self-sealing plug. Self-sealing plugs comprise an absorbent material. Absorbent materials in this invention are polymers that can absorb liquid at least 10 times more than the weight of the absorbent material or form a viscous solution. Absorbent materials include but are not limited to carboxymethylcellulose (CMC), cellulose gums, hydrolyzed acrylonitrile graft copolymer, neutralized starch-acrylic acid graft copolymer, acrylamide copolymer, modified crosslinked polyvinyl alcohol, neutralized crosslinked polyacrylic acid, crosslinked polyacrylate salts, or neutralized crosslinked isobutylene-maleic anhydride copolymers, or salts or mixtures thereof. In different embodiments, the weight percentage of absorbent materials in the plugs of this invention is from about 5% to about 40%, from about 7% to about 35%, or from about 10% to about 30%.

In some embodiments a sintered porous plastic plug of the present invention comprises a sintered polymeric material. The sintered porous plastic plugs in this invention can block the passage of aerosol particles. The sintered porous plastic plugs also block passage of aerosol bound bacteria with a filtration efficiency greater than 95%, 96%, 97%, 98% or 99% on a 1/16 inch thickness based on ASTM F 2101, a standard test known to one of ordinary skill in the art.

In some embodiments, the sintered porous plugs of the present invention can change color when the plugs contact a liquid solution. Color change indicators are optionally added to the sintered porous plastic plugs to show the extent of contact of the plug with a liquid. In one embodiment, color change indicators are added before sintering. In some embodiments, a color change indicator comprises an inorganic or organic dye, including food grade dyes, azo compounds, or azo dyes. In some embodiments, color change indicators do not comprise inorganic salts, including transition metal salts. Various color change indicators are disclosed in US 2008/0199363.

In some embodiments, a color change indicator comprises FD&C Blue No. 1, FD&C Blue No. 2, FD&C Green No. 3, FD&C Red No. 40, FD&C Red No. 3, FD&C Yellow No. 5, FD&C Yellow No. 6, Solvent Red 24, Solvent Red 26, Solvent Red 164, Solvent Yellow 124, Solvent Blue 35, or combinations thereof.

In some embodiments sintered porous plastic plugs of the present invention can block blood, plasma or serum under normal pipetting conditions. In some embodiments sintered porous plastic plugs of the present invention can block aqueous solutions under normal pipetting conditions. In some embodiments sintered porous plastic plugs of the present invention can block a solution comprising both water and miscible organic solvent under normal pipetting conditions. In some embodiments sintered porous plastic plugs of the present invention can block a solution comprising both water and miscible organic solvent wherein the organic solvent is over 40% (V/V), over 50% (V/V), over 60% (V/V), over 70% (V/V), over 80% (V/V) or over 90% (V/V) under normal pipetting conditions. In some embodiments, the sintered porous plugs of the present invention can block polar organic solutions under normal pipetting conditions.

In some embodiments sintered porous plastic plugs of the present invention comprise an active functional ingredient, such as an activated carbon or an ion exchange material. Such active ingredient may be included at amounts of up to 1%, 5%, 10%, 20%, 30%, 40% or 50% (on a weight percentage basis).

In some embodiments, the sintered porous plugs of the present invention comprise one or more antimicrobial agents to provide plugs with antimicrobial properties. The antimicrobial agents include, but are not limited to, chlorhexidine and its salts, triclosan, silver, and tertiary amine based antimicrobial agents. In some embodiments, the antimicrobial agents have a total weight percentage up to 0.5%, 1%, 2%, 3%, 4% or 5%. In some embodiments, the antimicrobial agents have a total weight percentage greater than 5%. Other antimicrobial compositions may be employed as disclosed in U.S. Pat. Nos. 3,141,321; 4,402,959; 4,430,381; 4,533,435; 4,625,026; 4,736,467; 4,855,139; 5,069,907; 5,091,102; 5,639,464; 5,853,883; 5,854,147; 5,894,042; 5,919,554 and 6,551,608.

In some embodiments, the sintered porous plastic plugs of the present invention have a layered structure.

In some embodiments the sintered porous plastic plugs comprise both self-sealing and non self-sealing regions. In some embodiments the sintered porous plastic plugs comprise both color change indicating regions and regions that do not change color. In some embodiments, sintered porous plastic plugs may contain more two or more layers, for example three, four, five, six or more layers.

In one embodiment, different levels or layers of the plug can have different compositions that impart different functional characteristics. For example, a first layer (chamfer or small cylinder or hemisphere) of the part (the first layer) can have a plastic polymer such as HDPE, UHMWPE, LDPE or polypropylene. A second layer can have a plastic polymer with an active ingredient, for example an antimicrobial. A third layer can have a self-sealing ingredient such as CMC. As a specific example of this embodiment, for a plug that is 0.75" long with each of the chamfered ends being 0.25", the first 0.25" can be made of plastic polymer, the next 0.25" can be made of plastic polymer containing an active ingredient (such as an antimicrobial, and the second chamfered end (the final 0.25") can be made of a third material such as a self-sealing ingredient.

In some embodiments, the sintered porous plugs of the present invention have colors to identify attributes of the serological pipettes. That is, color coded plugs may be used to identify the serological pipette volume, the material comprising the serological pipette such as polystyrene, polypropylene or glass, sterilization conditions or sterilization methods. In other embodiments color coded plugs may be used to identify some functional property of the plug, such as self-sealing, anti-microbial, the ability to block a solution comprising both water and miscible organic solvent, activated carbon or color change indicating properties of the plugs. In some embodiments specific sections of sintered porous plugs are colored.

In a specific embodiment, the sintered porous plastic plug is hydrophobic, with a cylindrical body. Other than the plastic, the sintered porous plastic plug is free of any significant additives (less than 0.01% (wt %)). The plug has two ends and each of the two ends has the cross-sectional area less than 80% of the cross section area of cylindrical body. The plug's length to diameter ratio is preferably greater than 1. The plug has an average pore size from 10 µm to 50 µm and pore volume from 20% to 60%. The air flow of the plug is less than 500 seconds, less than 400 seconds, less than 300 seconds, less than 200 seconds or less than 100 seconds for passing 300 cc of air through the plug based on the ISO/DIS 5636-5 testing method, known to one of ordinary skill in the art. The plug is able to block water by pass when the pressure is lower than 0.1 bar. The plug is also able to block at least 95% aerosol under the ASTM F 2101 testing method, known to one of ordinary skill in the art.

In another embodiment, the body of the sintered porous plastic plug has a cylindrical shape. Other than the plastic, sintered porous plastic plug comprises at least 2%, 5%, 10% or 20% of absorptive material (wt %). The plug has two ends and each of the two ends has the cross-sectional area less than 80% of the cross sectional area of the cylindrical body. The plug's length to diameter ratio is greater than 1. The plug has an average pore size from 10 µm to 100 µm and a pore volume from 20% to 60%. The air flow of the plug is less than 500 seconds, less than 400 seconds, less than 300 seconds, less than 200 seconds or less than 100 seconds for passing 300 cc of air through the plug based on the ISO/DIS 5636-5 testing method. The plug blocks passage of water or an aqueous solution containing polar organic solvents when the pressure is lower than 0.2 bar, 0.4 bar, 0.6 bar, 0.8 bar or 1 bar. The plug also blocks at least 95% aerosol under the ASTM F 2101 testing method. The plug also can be self-sealing when it contacts a liquid.

Method of Making Sintered Porous Plastic Plugs

Sintered porous plastic plugs are produced by providing a plurality of plastic particles in a mold, the mold comprising a cavity having the desired shape of the sintered porous plastic plug. The plurality of plastic particles are disposed in the mold and sintered to produce a sintered porous plastic plug of the present invention. Sintering temperatures of different plastics are known to one of ordinary skill in the art. In some embodiments, vibration is optionally applied to the mold during sintering. Particles of any of the plastics described herein can be sintered into a sintered porous plastic plug of the present invention. Plastic particles, in some embodiments, are sintered at a temperature ranging from about 90° C. to about 370° C. In some embodiments, plastic particles are sintered at a temperature ranging from about 150° C. to about 260° C. The sintering temperature, according to embodiments of the present invention, is dependent upon and selected according to the identity of the plastic particles and is known to one of ordinary skill in the art.

Plastic particles, in some embodiments, are sintered for a time period ranging from about 30 seconds to about 30 minutes. In other embodiments, plastic particles are sintered for a time period ranging from about 1 minute to about 15 minutes or from about 5 minutes to about 10 minutes. In some embodiments, the sintering process comprises heating, soaking, and/or cooking cycles. Moreover, in some embodiments, sintering of plastic particles is conducted under ambient pressure (1 atm). In other embodiments, sintering of plastic particles is conducted under pressures greater than ambient pressure.

Methods of Making Filtered Serological Pipettes

In another aspect, the present invention provides methods of making a filtered serological pipette containing a sintered porous plastic filter plug. Serological pipettes are known to one of ordinary skill in the art and may be obtained from several commercial vendors such as Fisher Scientific, VWR international, Sigma Aldrich, Corning, and Becton Dickinson. Different sizes of serological pipettes may be employed in the present invention, including but not limited volumes from 0.2 ml to 50 ml, such as 0.2 ml, 0.5 ml, 1 ml, 5 ml, 10 ml, 20 ml and 50 ml. Serological pipettes may be made from different materials such as glass, polystyrene, and polypropylene. In one embodiment, a method of making a serological pipette comprises providing a sintered porous plastic plug comprising a cylindrical porous body, a first end and a second end, the first end having a cross-sectional area less than the cross-sectional area of the body, and the second end having a cross-sectional area less than the cross-sectional area of the body, and at least partially disposing one end the sintered porous plastic plug in a lumen of the serological pipette. In another embodiment, a method of making a serological pipette comprises providing a sintered porous plastic plug comprising a porous body, a first end and a second end, the first end having a cross-sectional area less than the cross-sectional area of the body and at least partially disposing the first end of the sintered porous plastic plug in a lumen of the serological pipette.

Once one end of the sintered porous plastic plug is disposed in the lumen of the serological pipette, pressure is applied to insert the sintered porous plastic plug to the desired location in the lumen of the serological pipette.

One advantage of the sintered porous plastic plugs of the present invention is that porous plastic plugs can be inserted into serological pipettes with greater efficiency in comparison to plugs that do not have a first end and a second end, the first end having a cross-sectional area less than the cross-sectional area of the cylindrical body, and the second end having a cross-sectional area less than the cross-sectional area of the cylindrical body. This advantage increases efficiency of plug insertion thereby decreasing costs and the possibility of tearing or deformation of the plug, or insertion failure. In one test, the assembly equipment for insertion of plugs into serological pipettes had a 10%-20% rejection or breakage rate when using plugs which did not have chamfered ends which was reduced to about 1% after introduction of the chamfered porous plastic plug.

Sintered porous plastic plugs are inserted into pipettes by high speed automated insertion machines. The machine can run at the speed of thousands of plug insertions per hour. Serological pipettes are generally open cylinders. The filters must fit in the serological pipette tightly to provide the serological pipette with a good barrier to prevent potential contamination generated by aerosols or over drawing, also called over pipetting. This requires a high precision alignment for the pipette, push pin and the filter plug. Even a small amount of misalignment can cause broken parts or machine shut down. The plugs in embodiments of the present invention are able to dramatically increase the tolerance of misalignment to higher than 0.1 mm, 0.2 mm, 0.4 mm, 0.6 mm, 0.8 mm or 1 mm. Insertion machines can be purchased in many places, such as Cambridge Automatic Inc., Natick, Mass.; TurboFil Packaging Machines, Mount Vernon, N.Y.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

EXAMPLE 1

Production of a Sintered Porous Plastic Plug for a Filtered Serological Pipette

HDPE particles having an average size of 320 μm are obtained from LyondellBasell. The HPDE particles are mixed to make a homogeneous powder blend. The homogeneous powder blend of 100% (weight) polyethylene particles is disposed in a mold and sintered at a temperature of 170° C. for about 3 minutes to produce a sintered porous plastic plug comprising a cylindrical porous body, a first end and a second end, the first end having a cross-sectional area about 50-70% less than the cross-sectional area of the body, and the second end having a cross-sectional area about 50-70% less than the cross-sectional area of the body. The sintered porous plastic plug has an average pore size of about 78 μm and a porosity of about 45%. Moreover, the sintered porous plastic plug has an overall length of about 1 cm.

EXAMPLE 2

Production of a Sintered Porous Plastic Self-Sealing Plug for a Filtered Serological Pipette HDPE particles having an average size of 320 μm are obtained from LyondellBasell. CMC particles with average particle size of 150 microns are obtained from TicGums Inc., White Marsh, Md., US. The CMC and HPDE particles are mixed to make a homogeneous powder blend. The homogeneous powder blend of 90% (weight) polyethylene particles and 10% CMC particles is disposed in a mold and sintered at a temperature of 170° C. for about 3 minutes to produce a sintered porous plastic plug comprising a cylindrical porous body, a first end and a second end, the first end having a cross-sectional area about 50-70% less than the cross-sectional area of the body, and the second end having a cross-sectional area about 50-70% less than the cross-sectional area of the body. The sintered porous plastic plug has an average pore size of about 78 μm and a porosity of about 45%. Moreover, the sintered porous plastic plug has an overall length of about 1 cm.

EXAMPLE 3

Figure 5:
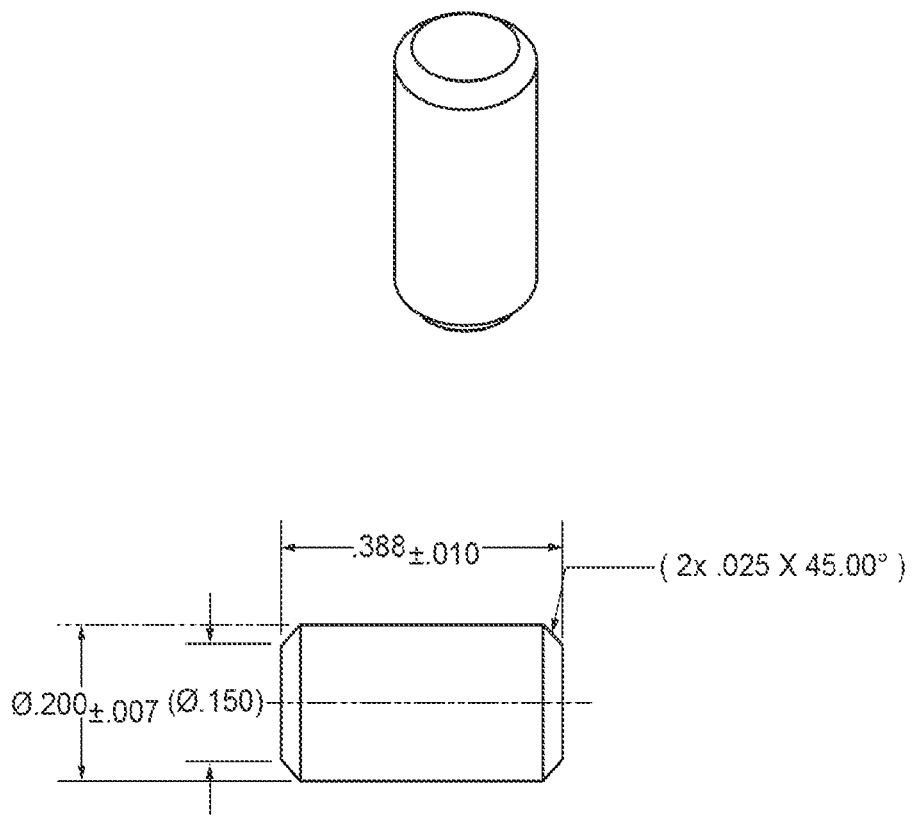
FIG. 5 is a perspective view of a sintered porous plastic filter plug (Product A) made according to Example 3. Dimensions in inches.
Figure 7:
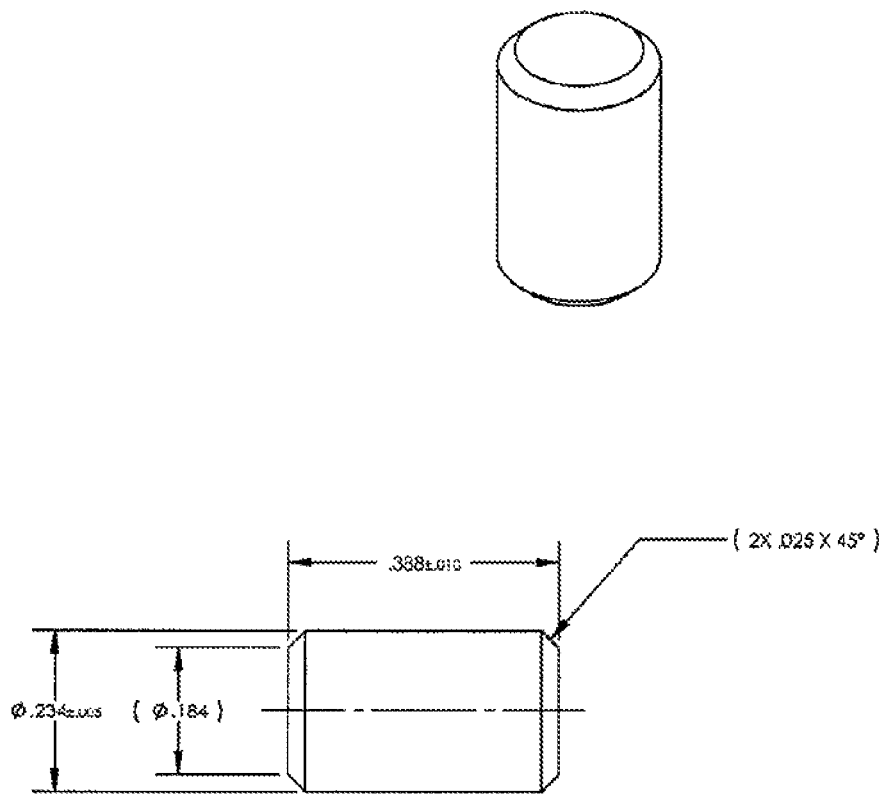
FIG. 7 is a perspective view of a sintered porous plastic filter plug (Product C) made according to Example 3. Dimensions in inches.

Production of a Sintered Porous Plastic Self-Sealing Plug for a Filtered Serological Pipette UHMWPE particles having an average size of 120 μm were obtained from Ticona, Florence, Ky., US. CMC particles with average particle size of 150 microns were obtained from TicGums Inc., White Marsh, Md., US. The CMC and UHMWPE particles were mixed to make a homogeneous powder blend. The homogeneous powder blend of 90% (weight) UHMWPE particles and 10% CMC particles was disposed in a mold and sintered at a temperature of 180° C. for about 5 minutes to produce a sintered porous plastic plug comprising a porous body, a first end and a second end, the first end having a cross-sectional area about 50-70% less than the cross-sectional area of the body, and the second end having a cross-sectional area about 50-70% less than the cross-sectional area of the body. The sintered porous plastic plug had an average pore size of about 17 μm and a porosity of about 31%. Moreover, the sintered porous plastic plug had an overall length of about 1 cm. Products A and C in Table 1 were made according to Example 3. Product A is shown in FIG. 5. Product C is shown in FIG. 7.

EXAMPLE 4

Figure 6:
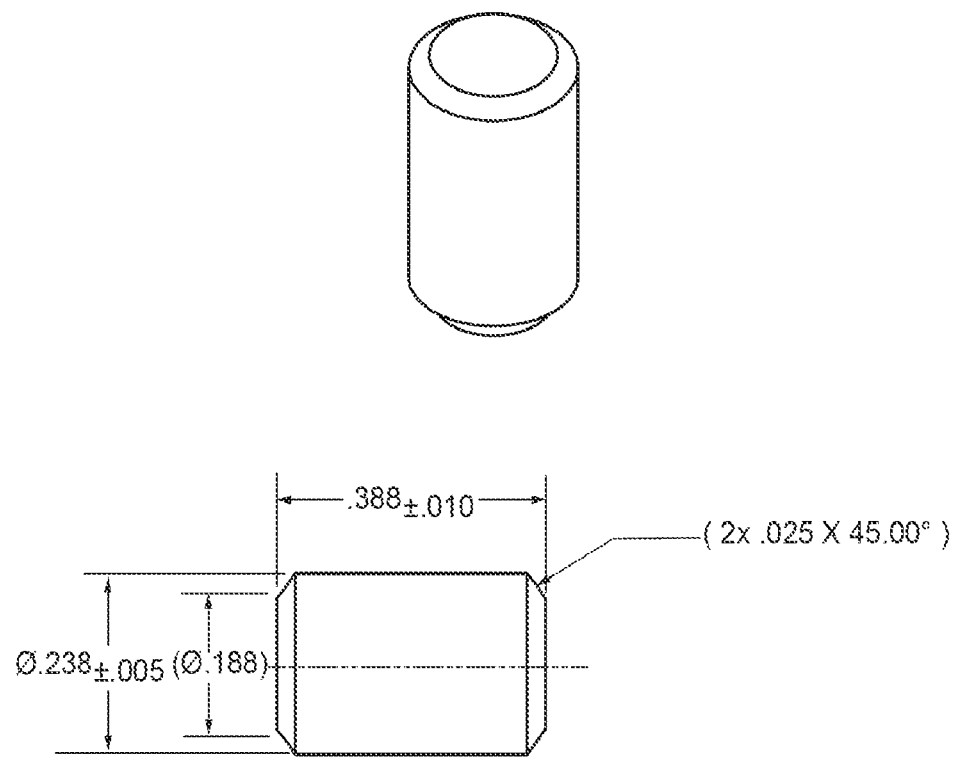
FIG. 6 is a perspective view of a sintered porous plastic filter plug (Product B) made according to Example 4. Dimensions in inches.

Production of a Sintered Porous Plastic Self-Sealing Plug for a Filtered Serological Pipette UHMWPE particles having an average size of 120 μm were obtained from Ticona, Florence, Ky., US. CMC particles with average particle size of 150 microns were obtained from TicGums Inc., White Marsh, Md., US. The CMC and UHMWPE particles were mixed to make a homogeneous powder blend. The homogeneous powder blend of 80% (weight) UHMWPE particles and 20% CMC particles was disposed in a mold and sintered at a temperature of 180° C. for about 5 minutes to produce a sintered porous plastic plug comprising a porous body, a first end and a second end, the first end having a cross-sectional area about 62% less than the cross-sectional area of the body, and the second end having a cross-sectional area about 62% less than the cross-sectional area of the body. The sintered porous plastic plug had an average pore size of about 16 μm and a porosity of about 29%. Moreover, the sintered porous plastic plug had an overall length of about 1 cm. Product B in Table 1 was made according to Example 4. Product B is shown in FIG. 6.

Products A, B and C made according to Examples 3 and 4 have a cylindrical shape with two ends whose cross sectional areas are significantly smaller than the cross-section area of cylindrical body. The products are made by one step molding process. Products A, B and C listed in the table 1 have following benefits:

1: Water intrusion pressure above 0.7 bar. The high water intrusion pressure of these products prevents the water based liquids from passing through and prevents contamination of suction devices when over pipetting during normal operating conditions.
2: Air flow of 300 cc of air through the filter plug in less than 500 seconds following the ISO/DIS 5636-5 Gurley testing method.
3: High air flow provides an adequate flow rate for drawing liquid using a drawing or pipetting device;
4: Aerosol and bacteria filtration efficiency over 99% based on the ASTM F 2101 test;
5: The broken part rate caused by misalignment of the filter plug into the serological pipette decreased from over 10% to less than 1%. Products A, B and C are superior in several respects to other products on the market.

TABLE 1

Sintered porous plastic pipette plug

| Product | Length (mm) | Body diameter (mm) | End diameter (mm) | End:Body area ratio | weight (g) | Density (g/cm$^3$) | Pore size (μm) | Pore volume (%) | Air flow (Gurley) in seconds) for 300 cc of air | Water intrusion pressure (bar) |
|---|---|---|---|---|---|---|---|---|---|---|
| A | 9.9 | 5.1 | 3.8 | 56% | 0.12 | 0.59 | 17 | 31 | 140 | >0.7 |
| B | 9.9 | 6.0 | 4.8 | 62% | 0.192 | 0.68 | 16 | 29 | 330 | >0.7 |
| C | 9.9 | 5.9 | 4.8 | 64% | 0.172 | 0.62 | 17 | 31 | 150 | >0.7 |

EXAMPLE 5

Production of a Sintered Porous Plastic Self-Sealing Plug for a Filtered Serological Pipette UHMWPE particles having an average size of 120 μm were obtained from Ticona, Florence, Ky., US. CMC particles with average particle size of 150 microns were obtained from TicGums Inc., White Marsh, Md., US. The CMC and UHMWPE particles were mixed to make a homogeneous powder blend. The homogeneous powder blend of 90% (weight) UHMWPE particles and 10% CMC particles was disposed in a mold and sintered at a temperature of 180° C. for about 5 minutes to produce a sintered porous plastic plug comprising a porous cylindrical body, a first end and a second end, the first end having a cross-sectional area about 56% less than the cross-sectional area of the body, and the second end having a cross-sectional area about the same as cross-sectional area of the cylindrical body. The sintered porous plastic plug had an average pore size of about 17 μm and a porosity of about 31%. Moreover, the sintered porous plastic plug had an overall length of about 1 cm.

EXAMPLE 6

Production of a Sintered Porous Plastic Plug for a Filtered Serological Pipette

UHMWPE particles having an average size of 150 μm are obtained from Ticona, Florence, Ky., US. The UHMWPE particles are mixed to make a homogeneous powder blend. The homogeneous powder blend of 100% (weight) UHMWPE particles is disposed in a mold and sintered at a temperature of 180° C. for about 5 minutes to produce a sintered porous plastic plug comprising a porous cylindrical body, a first end and a second end, the first end having a cross-sectional area about 50-70% less than the cross-sectional area of the body, and the second end having a cross-sectional area about 50-70% less than the cross-sectional area of the cylindrical body. The sintered porous plastic plug has an average pore size of about 30 μm and a porosity of about 45%. Moreover, the sintered porous plastic plug has an overall length of about 1 cm.

EXAMPLE 7

Production of a Sintered Porous Plastic Self-Sealing Color Changing Plug for a Filtered Serological Pipette UHMWPE particles having an average size of 150 μm are obtained from Ticona Florence, Ky., US. CMC particles with average particle size of 150 microns are obtained from TicGums Inc., White Marsh, Md., US. Food dye erioglaucine is from Sigma Aldrich. The CMC and UHMWPE particles, and erioglaucine are mixed to make a homogeneous powder blend. The homogeneous powder blend of 89.98% (weight) UHMWPE particles, 10% CMC particles and 0.02% erioglaucine are disposed in a mold and sintered at a temperature of 180° C. for about 5 minutes to produce a sintered porous plastic plug comprising a porous cylindrical body, a first end and a second end, the first end having a cross-sectional area about 50-70% less than the cross-sectional area of the cylindrical body, and the second end having a cross-sectional area about 50-70% less than the cross-sectional area of the body. The sintered porous plastic plug has an average pore size of about 30 μm and a porosity of about 45%. The sintered porous plastic plug has an overall length of about 1 cm. The sintered porous plastic plug changes color upon contact with a liquid.

EXAMPLE 8

Production of a Sintered Porous Plastic Self-Sealing Plug for a Filtered Serological Pipette which Seals Upon Contact with Polar Organic Solvent UHMWPE particles having an average size of 150 μm are obtained from Ticona Florence, Ky., US. Carbopol 907 particles (polyacrylic acid) are from Lubrizol, Cleveland, Ohio, US. The Carbopol 907 and UHMWPE particles are mixed to make a homogeneous powder blend. The homogeneous powder blend of 90% (weight) UHMWPE particles and 10% Carbopol particles are disposed in a mold and sintered at a temperature of 180° C. for about 5 minutes to produce a sintered porous plastic plug comprising a porous cylindrical body, a first end and a second end, the first end having a cross-sectional area about 50-70% less than the cross-sectional area of the cylindrical body, and the second end having a cross-sectional area about 50-70% less than the cross-sectional area of the body. The sintered porous plastic plug has an average pore size of about 30 μm and a porosity of about 45%. The sintered porous plastic plug has an overall length of about 1 cm. The sintered porous plastic plug seals upon contact with a polar organic solvent.

All patents, patent applications, publications, and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those of skill in the art without departing from the spirit and scope of the invention. It should be understood that the foregoing relates only to preferred embodiments of the present invention and that numerous modifications or alterations may be made therein without departing from the spirit and the scope of the present invention as defined in the following claims.

The invention claimed is:

1. A sintered porous plastic pipette plug, comprising:
a rigid cylindrical body having a cross sectional area configured to fit into a serological pipette, a first end and a second end, wherein each of the first end and the second end comprise a tapered tip structure with a cross sectional area of the tapered tip being at least 5% less than the cross sectional area of the cylindrical body, wherein in use, the tapered tip structure inserted into the serological pipette corrects for misalignment of the plug relative to the serological pipette,
wherein the plug has a length of about 5-15 mm and a length to diameter ratio greater than about 1, a water intrusion pressure greater than about 0.2 bar, and wherein the sintered porous plastic plug blocks passage of over about 95% of aerosol particles.

2. The sintered porous plastic pipette plug of claim 1, further comprising:
an absorptive material; wherein the plug has an average pore size from 10 μm to 100 μm, a water intrusion pressure greater than 0.7 bar, and an air flow rate less than 500 seconds/300 cc based on the ISO/DIS 5636-5 Gurley testing method.

3. The sintered porous plastic pipette plug of claim 2, wherein the absorptive material is carboxymethylcellulose (CMC), cellulose gums, hydrolyzed acrylonitrile graft copolymer, neutralized starch-acrylic acid graft copolymer, acrylamide copolymer, modified crosslinked polyvinyl alcohol, neutralized crosslinked polyacrylic acid, crosslinked polyacrylate salts, or neutralized crosslinked isobutylene-maleic anhydride copolymers, or salts or mixtures thereof.

4. The sintered porous plastic pipette plug of claim 3, wherein the absorptive material is carboxymethylcellulose or polyacrylic acid.

5. The sintered porous plastic pipette plug of claim 1, wherein the plastic is selected from the group consisting of polyethylene and polypropylene, and combinations and copolymers thereof.

6. The sintered porous plastic pipette plug of claim 5, wherein the polyethylene is high density polyethylene or ultrahigh molecular weight polyethylene.

7. The sintered porous plastic pipette plug of claim 1, further comprising an absorptive material.

8. The sintered porous plastic pipette plug of claim 1, having a pore size range of 10 microns to 50 microns.

9. The sintered porous plastic pipette plug of claim 1, having a water intrusion pressure of greater than about 0.3 bar, 0.4 bar, 0.5 bar, 0.6 bar, 0.7 bar, 0.8 bar or 1 bar.

10. The sintered porous plastic pipette plug of claim 1, having a length to diameter ratio up to about 5.

11. The sintered porous plastic pipette plug of claim 1, comprising carboxymethylcellulose or polyacrylic acid.

12. The sintered porous plastic pipette plug of claim 1, further comprising a color change indicator.

13. The sintered porous plastic pipette plug of claim 1, further comprising an anti-microbial agent.

14. The sintered porous plastic pipette plug of claim 13, wherein the anti-microbial agent is selected from the group consisting of chlorhexidine and its salts, triclosan, silver and a tertiary amine based agent.

15. A serological pipette comprising the sintered porous plastic pipette plug of claim 1.

16. The sintered porous plastic pipette plug of claim 1, wherein the tapered structure comprises an angle of about 45° from the cylindrical body.

17. The sintered porous plastic pipette plug of claim 1, wherein the tapered structure has a cross-sectional area of about 50% less than the cross-sectional area of the cylindrical body.

18. The sintered porous plastic pipette plug of claim 1, wherein the cylindrical body comprises a central lumen axis and wherein the tapered structure tapers upwardly from the cylindrical body and inwardly toward the central lumen axis.

19. A method of making a filtered serological pipette comprising:
providing a serological pipette with a lumen, and a first end and a second end;
providing a rigid sintered porous plastic plug comprising a cylindrical body having a diameter equal to or less than the diameter of the lumen and a tapered first end and a tapered second end, wherein the tapered first end and the tapered second end have a cross sectional diameter less than at least about 5% the cross sectional diameter of the cylindrical body, wherein in use, at least one of the tapered ends corrects for misalignment of the plug relative to the serological pipette;
at least partially disposing the first or the second tapered end of the sintered porous plastic plug into the first end of the serological pipette, such that the tapered end corrects for any misalignment of the plug relative to the serological pipette; and,
applying pressure to the sintered porous plastic plug to insert the sintered porous plastic plug into the lumen of the serological pipette such that the sintered porous plastic plug is located within the serological pipette and frictionally fit against the inner wall of the serological pipette.

20. The method of claim 19, wherein the first end of the serological pipette has a wider diameter than the second end of the serological pipette.

* * * * *